Aug. 19, 1952 — H. S. PRATT — 2,607,631
AUTOMOBILE WHEEL LOCK
Filed Feb. 20, 1951 — 2 SHEETS—SHEET 1
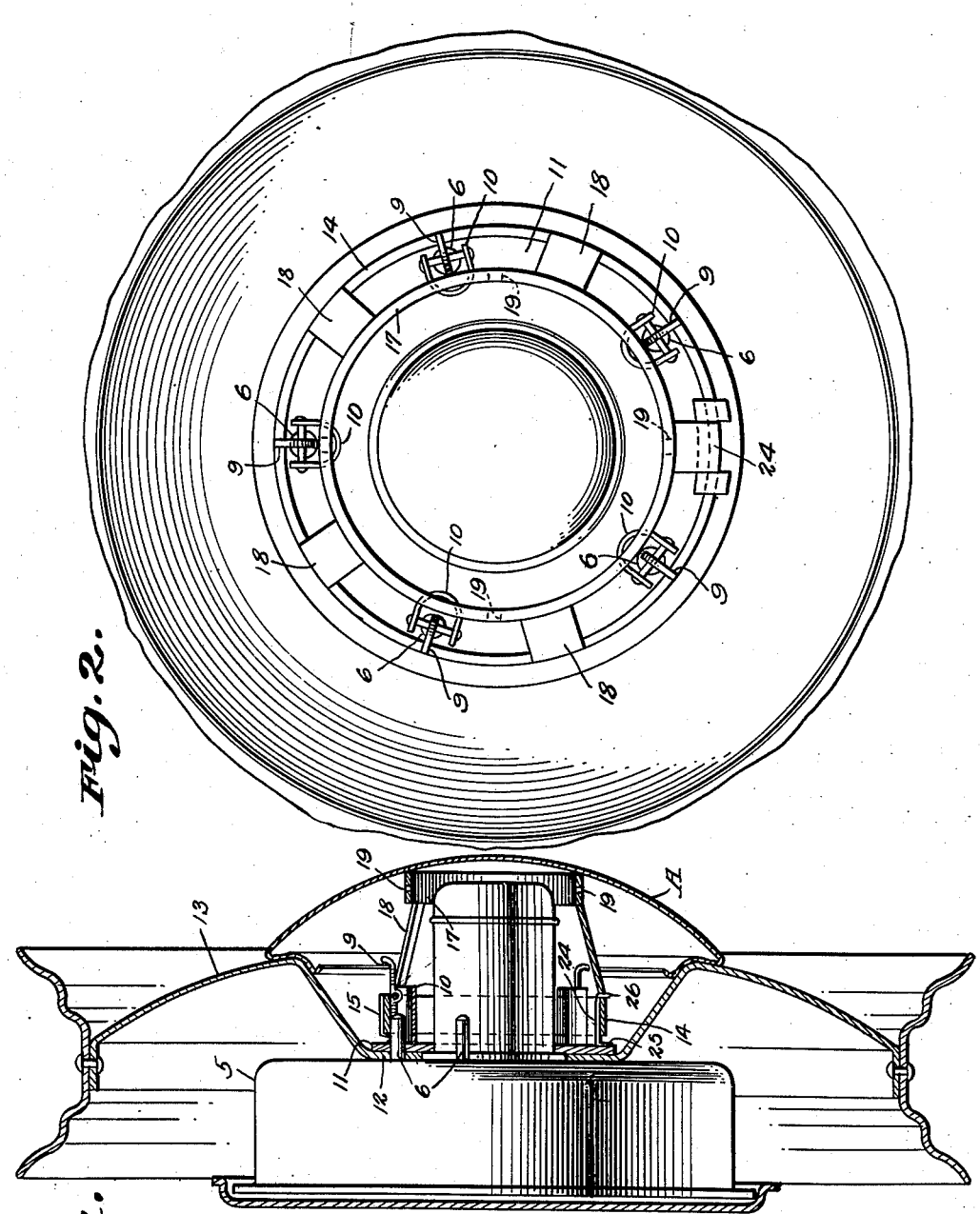
H. S. Pratt
INVENTOR,
BY C. A. Snow & Co.
ATTORNEYS.

Aug. 19, 1952     H. S. PRATT     2,607,631
AUTOMOBILE WHEEL LOCK
Filed Feb. 20, 1951     2 SHEETS—SHEET 2
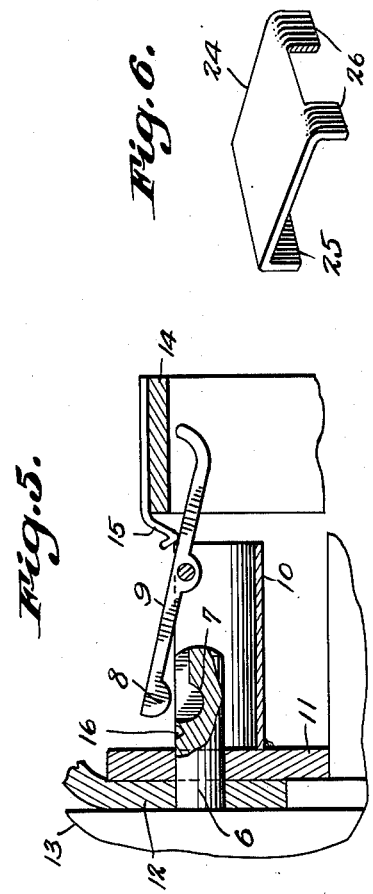
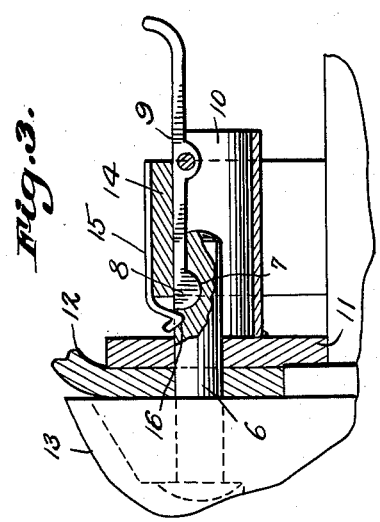
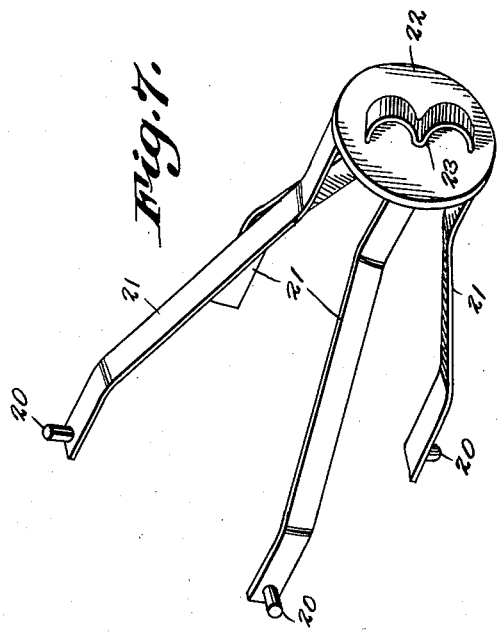
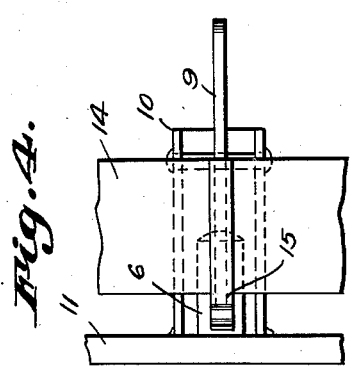
H. S. Pratt
INVENTOR,
BY C. A. Snow & Co.
ATTORNEYS.

Patented Aug. 19, 1952

2,607,631

UNITED STATES PATENT OFFICE 2,607,631

AUTOMOBILE WHEEL LOCK

Harvey S. Pratt, Salix, Iowa

Application February 20, 1951, Serial No. 211,856

6 Claims. (Cl. 301—9)

This invention relates to motor vehicle wheel construction, the primary object of the invention being to provide a motor vehicle wheel which may be readily and easily removed from the usual wheel hub, or replaced with facility, eliminating the use of wrenches or like tools in order to replace wheels.

An important object of the invention is the provision of pivoted latch members carried by the wheel proper, which latch members cooperate with laterally extended securing pins, carried by the hub of the wheel, which pins and latch members firmly secure the removable wheel section to the hub.

Still another object of the invention is to provide means for insuring the proper positioning of the wheel on the hub, to align the pivoted latch arms with the pins extending from the hub of the wheel, and with which the latch arms connect in holding the wheel to its hub.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings,

Figure 1 is a sectional view through a wheel illustrating the attaching means constructed in accordance with the invention, the hub of the wheel being shown in elevation.

Fig. 2 is a side elevational view of the wheel, the hub cap of the wheel having been removed.

Fig. 3 is a sectional view through a portion of the wheel hub and one of the pins extending from the wheel hub, illustrating a latch arm in side elevation in its active or locking position.

Fig. 4 is a plan view thereof.

Fig. 5 is an elevational view illustrating a portion of the wheel in section, and illustrating a latch arm as moved to disengage the cooperating pin of the wheel hub.

Fig. 6 is a perspective view of the aligning plate, by means of which the pivoted latch arms are aligned with the cooperating latch pins.

Fig. 7 is a perspective view of the tool used in withdrawing the securing ring from its position adjacent to the keeper pins of the device.

Referring to the drawings in detail, the reference character 5 indicates the usual hub of a motor vehicle wheel, which hub includes laterally extending pins 6, which pins are provided with recesses 7 formed in the side wall thereof, the recesses being constructed to receive the enlargements 8 of the pivotal latch arms 9.

The pivotal latch arms 9 are mounted in the curved supporting plates 10 that have one of their respective ends welded or otherwise secured to the attaching ring 11, which ring 11 has openings designed to register with the pins 6 so that when the ring 11 is positioned over the pins and forced to the limit of its inward movement, the ring will closely engage the flange 12 forming a part of the disc wheel 13, the flange 12 being provided with openings that also register with the pins 6, so that the wheel may be readily positioned thereover.

Cooperating with the pivoted latch arms 9, is the lock ring 14 which is of a diameter to fit over the edges of the supporting plates 10 and outer surfaces of the pivoted latch arms 9, holding the pivoted latch arms 9 against the pins with the enlargements 8 in the recesses 7 of the pins. In order that the lock ring 14 will be held in position, spring fingers 15 are provided on the lock ring and extend inwardly therefrom, the spring fingers being so constructed and arranged that they will fall into the notches 16 formed in the pins 6, adjacent to the recesses 7, thereby holding the lock ring 14 against accidental displacement. It will be obvious that when the lock ring 14 has been positioned so that the spring fingers 15 engage within the notches 16, the spring fingers will be held against outward movement, unless the lock ring is moved to a position as shown by Fig. 5 of the drawings.

The lock ring 14 is connected with the ring 17, by means of the arms 18, the rings 17 having openings 19 for the reception of the round lugs 20 carried at the ends of the spring arms 21 of the tool as shown by Fig. 7 of the drawings. This tool is designed for removing the locking means, when the wheel proper is to be removed, since it is necessary to exert excessive force to cause the spring fingers to move from the notches 16 to release the pivoted latch arms 9.

The spring arms 21 are connected to the disc 22 which is provided with the finger piece 23 under which the fingers of the operator may be positioned in gripping the tool to operate the same.

From the foregoing it will be obvious that when it is desired to remove a wheel from a motor vehicle, it is only necessary to remove the hub cap, which in the present showing is indicated by the reference character A. The tool as shown by Fig. 7 may now be positioned within the ring 17 with the lugs 20 disposed within the openings 19 of the ring 17. The ring 17 may now be pulled by the tool to cause the spring fingers to disengage the pins, whereupon the pivoted latch arms 9 will be swung to their open positions, as the lock ring 14 is moved outwardly to the position as shown by Fig. 5. The wheel may now be readily removed and replaced. It is obvious that when the wheel is replaced the wheel is positioned so that the pins 6 pass through openings in the wheel.

In order to insure the proper aligning of the openings of the attaching ring 11 with the pins, and insure the proper positioning of the lock ring 14 to cause the spring fingers 15 to move over the pivoted latch arms 9, the aligning plate 24 is provided, the aligning plate 24 having a flange 25 at one end thereof which is welded or otherwise secured to the attaching ring 11, the opposite end of the aligning plate 24 being formed to provide a pair of extensions 26 adapted to engage opposite edges of the arm 18 falling opposite thereto. With one of the arms 18 positioned between the extensions 26, it is an easy matter to move the lock ring towards the pins, with the assurance that the pivoted latch arms will move into the recesses 7 to lock the wheel to its hub.

From the foregoing it is believed that the construction and operation of the wheel locking device will be obvious, and that further description as to the operation is unnecessary.

Having thus described the invention, what is claimed is:

1. In a motor vehicle wheel, a wheel hub, securing pins having recesses, extending from said hub, a main wheel section having openings fitted over the pins, wheel securing means embodying an attaching ring having openings fitted over said pins in contact with the wheel, latch arms carried by the attaching ring, movable into the recesses locking the main wheel section to the hub, said securing means also including an inner locking ring and an outer ring, arms connecting the rings, and means on said innerlocking ring engageable with said latch arms adapted to move the latch arms into and out of locking relation with the pins.

2. In a motor vehicle wheel, a wheel hub, securing pins having recesses, extending from the hub, a main wheel section removably secured to the hub, said main wheel section having openings fitted over the pins, wheel securing means embodying an attaching ring formed with openings, fitted over said pins in contact with the wheel, pivoted latch arms carried by said attaching ring, enlargements on the latch arms engageable within the recesses holding the removable wheel section on the hub, and a locking ring movable over the latch arms adapted to move the latch arms into and out of locking relation with said pins.

3. In a motor vehicle wheel, a wheel hub, securing pins having recesses formed in the sides thereof, extending from the hub, a main wheel section removably secured to the hub, a main wheel section removably secured to the hub, said main wheel section having openings fitted over the pins, wheel securing means embodying an attaching ring formed with openings, fitted over said pins in contact with the wheel, pivoted latch arms carried by said securing ring, enlargements on the latch arms engageable within the recesses holding the removable wheel section on the hub, a locking ring movable over said latch arms, moving the latch arms into and out of locking relation with said pins, and spring fingers carried by said locking ring, engageable with said pins holding said locking ring and latch arms in their locking positions.

4. In a motor vehicle wheel, a wheel hub, securing pins extending laterally from the wheel hub, a main removable wheel section having openings fitted over said pins, an attaching ring having openings fitted over said pins in contact with the removable wheel section, pivoted latch arms carried by said attaching ring engageable with said pins securing the ring in position against said removable wheel section, means for securing said latch arms in their locking positions, and means for holding said latch arms in their locking positions.

5. In a motor vehicle wheel, a wheel hub, securing pins extending from said wheel hub, a main wheel section having openings fitted over the pins, an attaching ring having openings fitted over the pins engageable with said removable wheel section holding the wheel section to the hub, latch members carried by said attaching ring engageable with said pins securing said attaching ring in position, a locking ring movable over said latch arms holding said latch arms in their latching positions, and means for guiding the locking ring over said pivoted latch members.

6. In a motor vehicle wheel, a wheel hub, securing pins extending from the hub, a main wheel section having openings, removably secured to the hub, said openings being fitted over the pins, curved supporting plates, an attaching ring formed with openings fitted over said pins, said supporting plates being secured to said attaching ring adjacent to said openings providing housings for said pins, pivoted latch members mounted on the attaching ring engageable with said pins securing the attaching ring in position on the pins, and a locking ring movable over said latch members adapted to secure the latch members in their active or inactive positions.

HARVEY S. PRATT.

REFERENCES CITED

The following references are of record in the file of this patent:

UNITED STATES PATENTS

| Number | Name | Date |
|---|---|---|
| 1,814,161 | Hynan | July 14, 1934 |
| 1,968,745 | Cochran | July 31, 1934 |

FOREIGN PATENTS

| Number | Country | Date |
|---|---|---|
| 500,355 | Great Britain | Feb. 7, 1939 |
| 470,891 | Germany | Feb. 12, 1929 |